United States Patent
Toriyama et al.

(10) Patent No.: US 7,116,449 B1
(45) Date of Patent: Oct. 3, 2006

(54) IMAGE PROCESSING APPARATUS

(75) Inventors: Hideyuki Toriyama, Toyokawa (JP); Hiroyuki Suzuki, Toyokawa (JP); Hideaki Mizuno, Toyokawa (JP); Nobuo Kamei, Toyokawa (JP); Tsuyoshi Yoneyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 944 days.

(21) Appl. No.: 09/722,475

(22) Filed: Nov. 28, 2000

(30) Foreign Application Priority Data

Nov. 29, 1999 (JP) .................... 11-337742
Nov. 29, 1999 (JP) .................... 11-337748

(51) Int. Cl.
*H04N 1/04* (2006.01)

(52) U.S. Cl. ............... 358/474; 358/488; 358/505; 358/504

(58) Field of Classification Search ........... 358/474, 358/473, 476, 479, 494, 488, 500, 505, 518, 358/504, 527, 530
See application file for complete search history.

(56) References Cited

U.S. PATENT DOCUMENTS

| | | | | |
|---|---|---|---|---|
| 5,153,605 A | * | 10/1992 | Ohara et al. ........... | 347/184 |
| 5,309,258 A | * | 5/1994 | Kouno et al. ........... | 358/523 |
| 5,868,666 A | | 2/1999 | Okada et al. ........... | 600/118 |
| 6,226,397 B1 | * | 5/2001 | Yamagata et al. ...... | 382/162 |
| 6,388,768 B1 | * | 5/2002 | Hada et al. ............. | 358/1.9 |

FOREIGN PATENT DOCUMENTS

| | | |
|---|---|---|
| JP | 62-281561 | 12/1987 |
| JP | 6-253116 A | 9/1994 |
| JP | 7-009677 | 1/1995 |
| JP | 7-135447 | 5/1995 |
| JP | 08023437 | * 1/1996 |
| JP | 8-265525 A | 10/1996 |
| JP | 10-271080 | 10/1998 |
| JP | 10-271288 A | 10/1998 |
| JP | 11-105371 | 4/1999 |
| JP | 11-112753 | 4/1999 |
| JP | 11-138955 | 5/1999 |
| JP | 11-147335 | 6/1999 |
| JP | 11-164139 | 6/1999 |
| JP | 11-165434 | 6/1999 |
| JP | 11-179939 | 7/1999 |
| JP | 11-266373 | 9/1999 |
| JP | 11-317887 | 11/1999 |

* cited by examiner

*Primary Examiner*—Jerome Grant, II
(74) *Attorney, Agent, or Firm*—Buchanan Ingersoll PC

(57) ABSTRACT

In an image processing apparatus which performs first and second operations, a first processor processes image data in correspondence to the first operation, while a second processor which processes image data in correspondence to the second operation. Further, a memory is shared by the first and second processors. A controller connects the first processor to the memory in the first operation and to connect the second processor to the memory in the second operation. For example, the above-mentioned first and second processors are constructed by a common device such as a field gate programmable array wherein a function thereof can be rewritten.

15 Claims, 9 Drawing Sheets

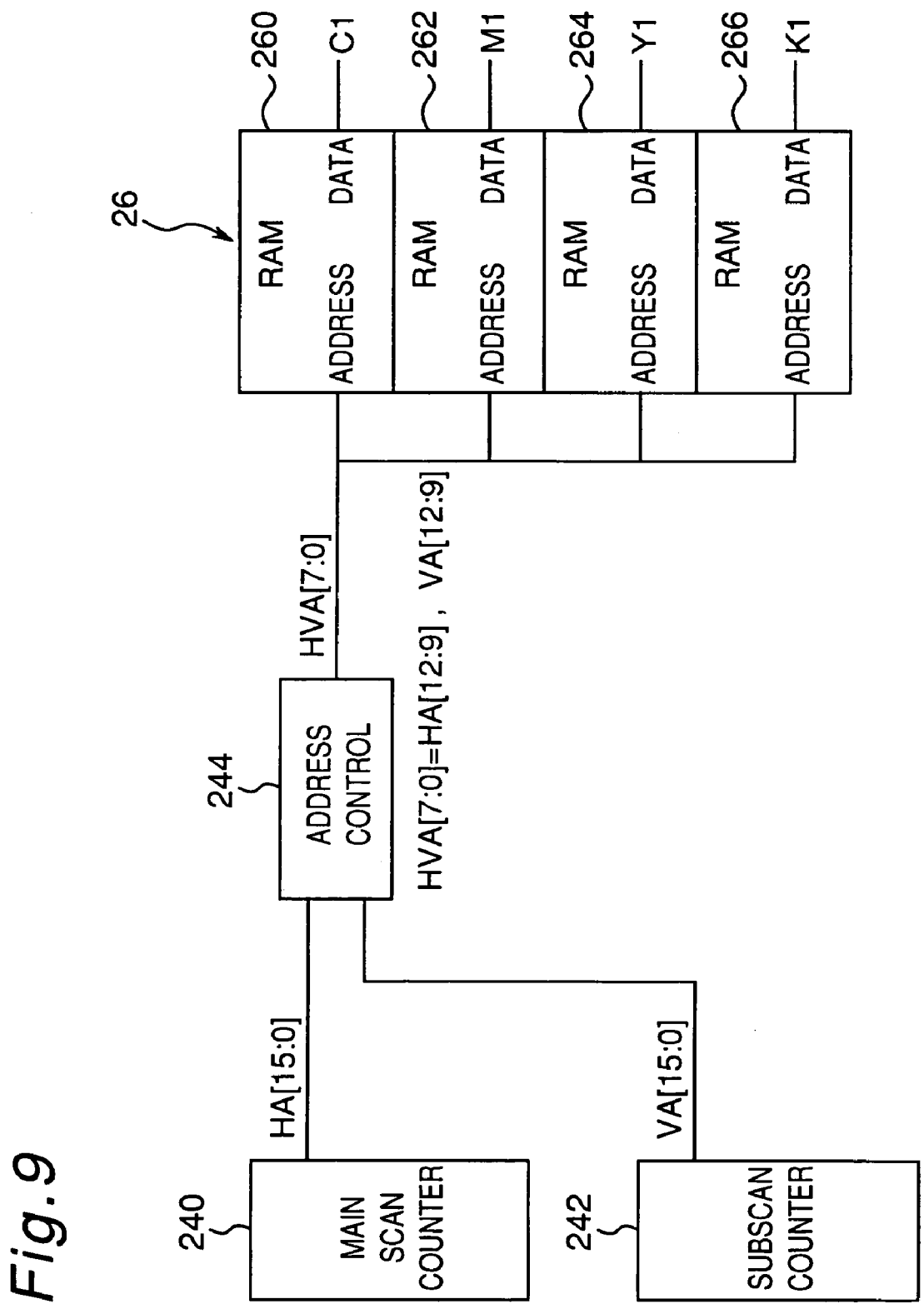

IMAGE PROCESSING APPARATUS

This application is based on applications Nos. 11-337742 and 11-337748 filed in Japan, the contents of which are hereby incorporated by reference.

BACKGROUND OF THE INVENTION

1. Field of the Invention

The present invention relates to image data processing.

2. Description of Prior Art

In a color image processing apparatus, a document is scanned for reading its image, and the obtained image data are converted to density data. Then, they are is subjected to various corrections. Before starting the scan, preprocessing is performed based on a prescan. For example, in the preprocessing, automatic exposure for removing the background of a document is performed, it is decided automatically whether the document is a color document or a monochromatic document, and the document size is detected.

It is also known that an image processing apparatus such as a printer has a test print circuit for performing test print, besides an image processing circuit for a normal print mode. A service man or the like can adjust the image forming process by using the test print circuit.

As mentioned above, an image processing apparatus performs operations not performed at the same time, and for each of the operations, a dedicated or separate circuit and a random access memory are provided. For example, in the first prior art apparatus mentioned above, the prescan and the scan are performed successively. Therefore, for example, the automatic exposure, the automatic color selection, the document size detection and the like performed in the prescan are not performed at the same time as the image reading in the scan. On the other hand, in the second prior art apparatus mentioned above, the test print and the normal image forming are not performed at the same time. Therefore, the print circuit for test print and the image processing circuit for normal print are not used at the same time. Therefore, the circuit scale of an image processing apparatus becomes larger, and this is one of factors which increases its cost.

SUMMARY OF THE INVENTION

An object of the present invention is to provide an image processing apparatus having a simpler structure.

In one aspect of the invention, an image processing apparatus comprises a first processor which processes image data in correspondence to a first operation, a second processor which processes image data in correspondence to a second operation, a memory shared by the first and second processors; and a controller which changes connection of the memory to the first and second processors. The controller connects the first processor to the memory in the first operation and connects the second processor to the memory in the second operation.

In another aspect of the invention, an image reading apparatus comprises a first processor which processes the data acquired in prescan, a second processor which processes image data acquired in normal scan, a memory shared by the first and second processors, and a controller which changes connection of the memory to the first and second processors. The controller connects the first processor to the memory on prescan and connects the second processor to the memory on normal scan. The memory stores document information acquired in prescan and stores conversion data for conversion of the image data on normal scan.

For example, the above-mentioned first and second processors are constructed by a common device such as a field gate programmable array wherein a function thereof can be rewritten.

An advantage of the present invention is that an image forming apparatus can be made compact and the cost thereof can be lowered because a block not used at the same time are shared.

BRIEF DESCRIPTION OF THE DRAWINGS

These and other objects and features of the present invention will become clear from the following description taken in conjunction with the preferred embodiments thereof with reference to the accompanying drawings, and in which:

FIG. 9 is a diagram on a block written to a field programmable gate array in test print mode.

DETAILED DESCRIPTION OF THE PREFERRED EMBODIMENTS

Figure 1:
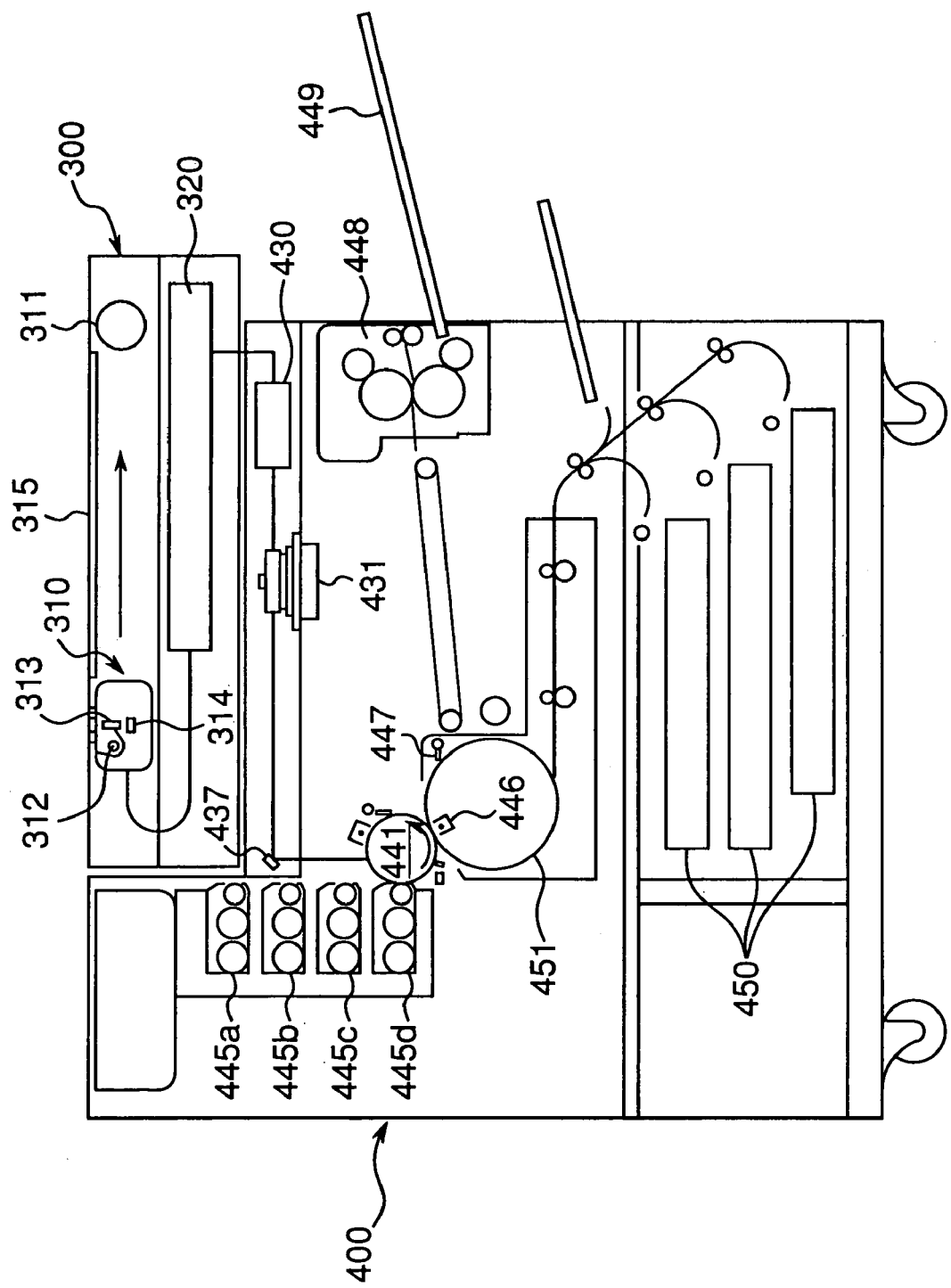
FIG. 1 is a sectional view of a digital color copying machine.

Referring now to the drawings, wherein like reference characters designate like or corresponding parts throughout the several views, FIG. 1 shows an entire structure of a digital color copying machine as an example of an image forming apparatus according to the invention. The digital color copying machine comprises an image reader 300 for reading a document image and a printer 400 for reproducing the image data read by the image reader 300. The image processing apparatus may be an image input/output apparatus such as an image reading apparatus or a printer, or a data processing apparatus for performing image processing, edition or the like of image data, or a system or an apparatus of a combination of the above-mentioned apparatuses.

In the image reader 300, a scanner 310 comprises an exposure lamp 312, a rod lens array 313 for condensing light reflected from a document, and a charge coupled device (CCD) color image sensor array 314. When a document image is read, the scanner 310 is driven by a scan motor 311 in a direction (subscan direction) represented with an arrow to scan the document put on a platen 15. The image sensor 314 converts the light reflected from the document to multi-level electric signals of three colors of R, G and B. The electric signals are converted by a color image processing unit 320 to 8-bit gradation data and are sent to a print controller 430. The color image processing unit 320 includes a circuit explained below with reference to FIGS. 2 to 5 or another circuit explained below with reference to FIGS. 6 to 9.

In the printer 400, the print controller 430 performs D/A conversion on the input image data (gradation data) to generate a drive signal which drives a laser diode to generate a laser beam. The laser beam is inclined by a polygon mirror 431 and is reflected by a mirror 437 onto a photoconductor drum 441 rotated. On the photoconductor drum 441, an electrostatic latent image is formed for each toner image formation of cyan (C), magenta (M), yellow (Y) and black (BK). Only one of the developing units 445a–445d of cyan (C), magenta (M), yellow (Y) and black (BK) is selected to develop the electrostatic latent image. A copy paper is supplied by one of cassettes 450 according to a desired paper size and is held on a transfer drum 451. The developed toner image is transferred onto the paper on the transfer drum 451 by a transfer charger 446.

The above-mentioned print process is repeated for the four colors of cyan, magenta, yellow and black. The scanner 310 repeats scanning in synchronization with the movement of the photoconductor drum 441 and the transfer drum 451. Then, the copy paper is separated from the transfer drum by activating a claw 447. Then, it passes a fixing unit 448 for fixing the toner images and is discharged onto a tray 449.

In the color copying machine, it is possible to perform a monochromatic copy by using only the developing unit 445d of black. It is also possible to perform a single color copy by using only one of the developing unit for the desired color.

The digital color copying machine has normal print mode for printing after reading a document image and test print mode for test print based on pattern data which have been stored. The change between normal print mode and test print mode is performed by an operational panel.

When print key is operated in normal copy mode, a prescan of a document is performed in the image reading apparatus 100. By using data sampled on the document in the rescan, the preprocessing mentioned above is performed such as automatic exposure, automatic color selection and automatic document size detection. Then, various parameters are set.

After the prescan is completed, normal scan for reading the document image is started. Image data read in the prescan are processed by a color image processor and are printed by the printer 200 on a sheet of paper.

On the other hand, when the print key is operated in test print mode, pattern data are generated by the color image processor without reading a document image, and the pattern data are printed by the printer 400 on a sheet of paper. By checking the obtained print, a user can understand the status of the apparatus and can adjust tone or the like.

Figure 2:
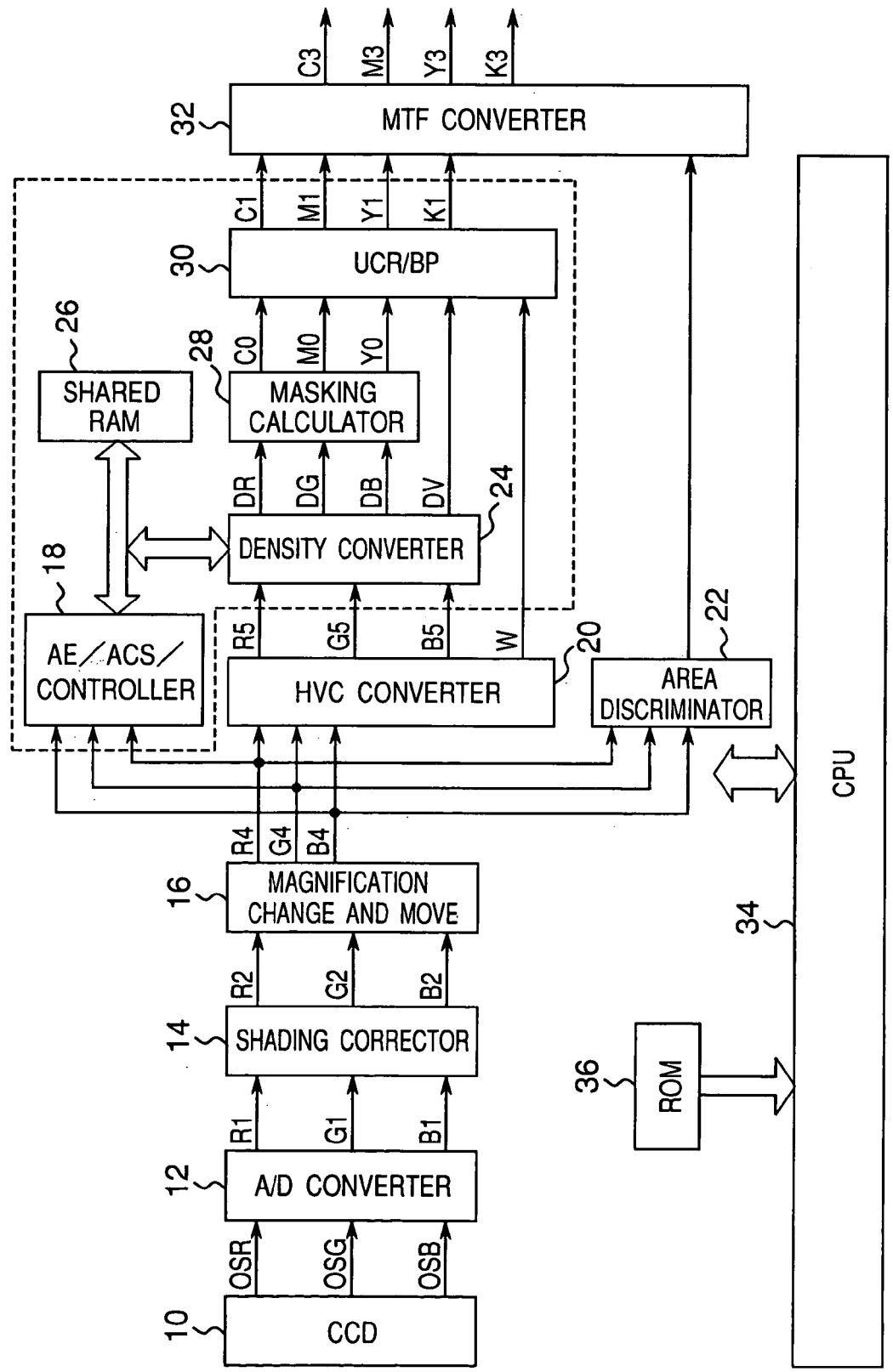
FIG. 2 is a block diagram of an image processing apparatus of a first embodiment of the invention.

FIG. 2 shows an entire structure of an image processing apparatus according to a first embodiment of the invention. Output signals of red, green and blue of a color CCD (charge coupled device) sensor 10 consisting of line sensors of three colors are converted to digital image data by an analog-to-digital converter 12. The digital image data of red (R), green (G) and blue (B) are corrected by a shading corrector 14 and are sent to a magnification change and move section 16. Image data R4, G4, B4 which have been subjected in the section 16 to the magnification change processing and move processing are sent to an AE/ACS/document size detection section 18, an HVC converter 20 and an area discriminator 22. The AE/ACS/document size detection section 18 performs automatic exposure (AE), automatic color selection (ACS) and document size detection in a prescan performed before reading a document. The HVC converter 20 converts the data R4, G4, B4 to HVC data and sends chroma data W to an undercolor remove and black paint section 30, while it sends the input data to a density converter 24 as data R5, G5, B5. The AE/ACS/document size detection section 18 and the density converter 24 share a random access memory (RAM) 26. The density converter 24 converts the image data R5, G5, B5 to density data DR, DG, DB, and a masking calculator 28 converts the density data DR, DG, DB to print data of cyan (C0), magenta (M0), yellow (Y0) and black (K0). Further, the undercolor remove and black paint section 30 performs the undercolor remove and black paint processing on the print color data C0, M0, Y0 by using the chroma data W, to output data C1, M1, Y1, K1. Further, the area discriminator 22 discriminates various types of areas based on the input data. The MTF corrector 32 corrects the data C1, M1, Y1, K1 according to the discrimination result of the area discriminator 22 and sends the corrected data to a printer. The CPU 34 controls the above-mentioned image processing circuit.

Figure 3:
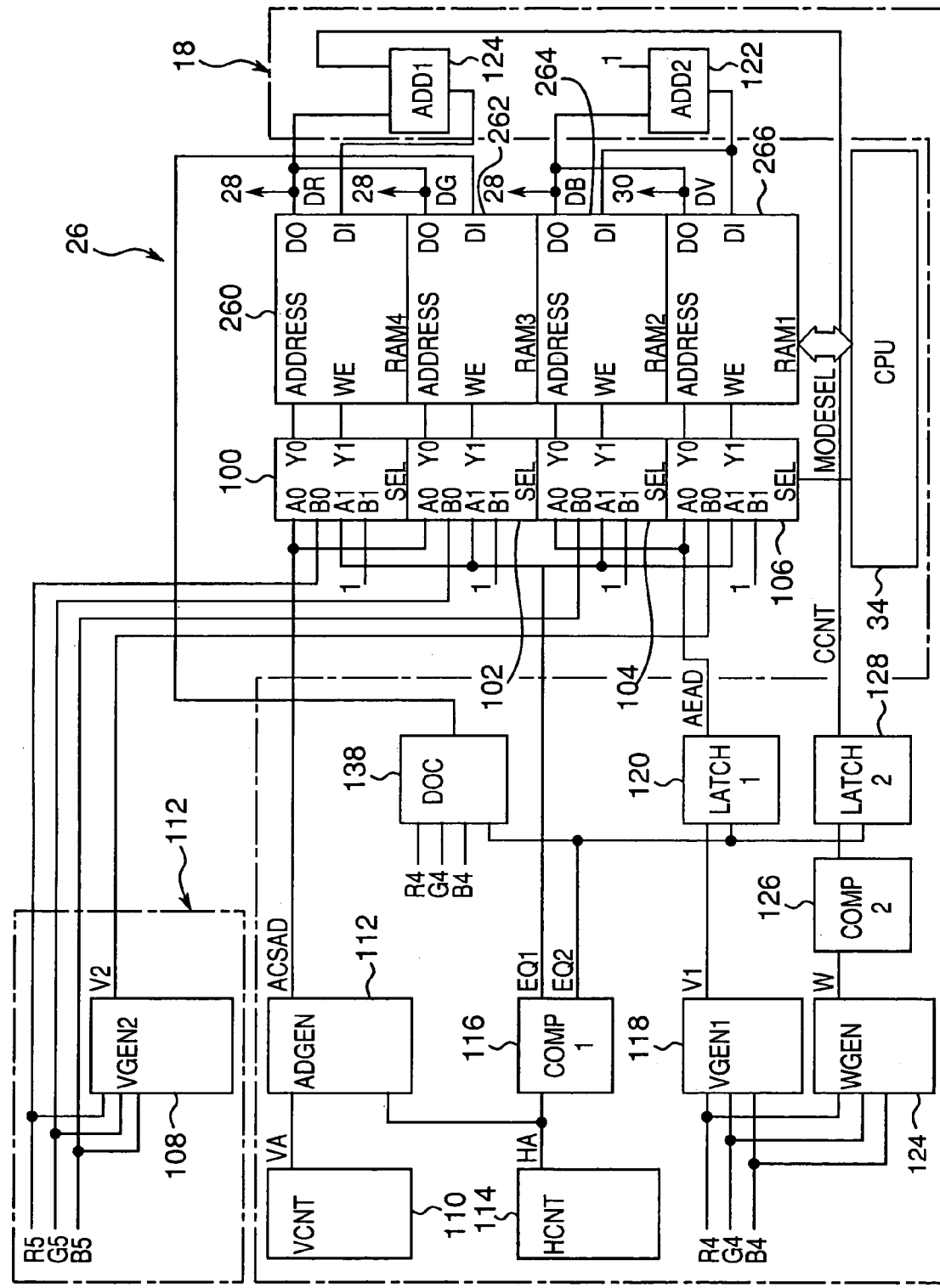
FIG. 3 is a block diagram of an AE/ACS/document size detection section, a density converter and a shared RAM.
Figure 4:
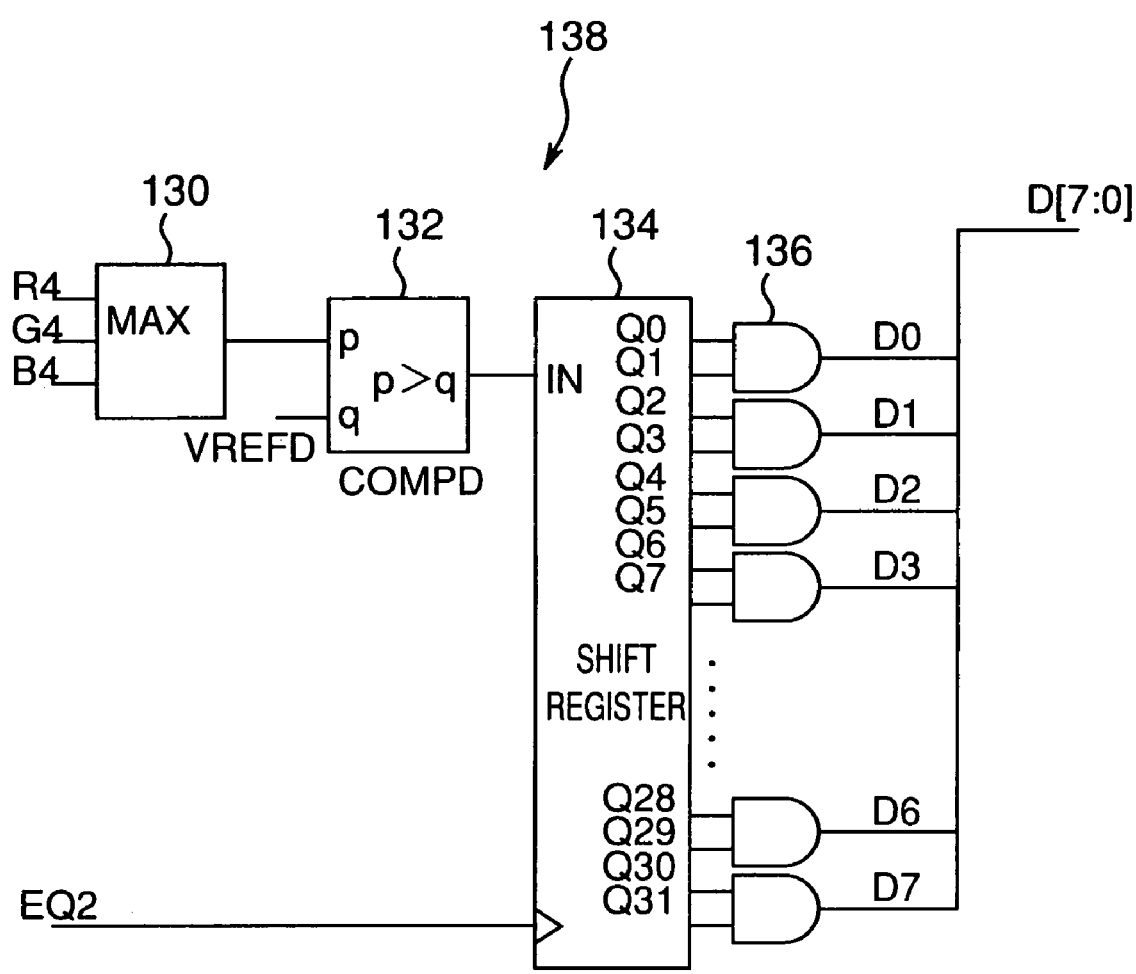
FIG. 4 is a block diagram of an AE/ACS/document size detection section and a part of a density converter.

FIGS. 3 and 4 show the AE/ACS/document size detection section 18, the density converter 24 and the shared RAM 26. The RAM 26 consists of four memories 260, 262, 264 and 266 for R, G, B and V, and it is shared by the AE/ACS/document size detection section 18 and the density converter 24. The AE/ACS/document size detection section 18 is an image preprocessor for processing based on sampling data on a document obtained before reading the document, while the density converter 24 is a part of a main image processor which processes image data obtained by reading a document. Thus, the memory 26 is shared by the preprocessor and a part of the main image processor. In concrete, in prescan, data are stored in the shared memory for image preprocessing (AE/ACD/document size detection), while in normal scan, the data are stored in the shared memory for image processing (density conversion). Select signal (MODESEL) instructs to change between the two uses. That is, the connection of the RAMs 260, 262, 264 and 266 are changed between the AE/ACS/document size detection section 18 and the density converter 24 according to select signal MODESEL inputted by selectors 100, 102, 104 and 106. In prescan, the CPU 34 sets mode selection signal MODESEL to 0 to connect the RAM 26 to the AE/ACS/document size detection section 18, while in normal scan, the CPU 34 sets mode selection signal MODESEL to 1 to connect the RAM 26 to the density converter 24. When MODESEL signal is 0, the selectors 100, 102, 104, 106 select A0, A1 as input signals and outputs them as Y0, Y1, while when MODESEL signal is 1, the selectors 100, 102, 104, 106 select B0, B1 as input signals and outputs them as Y0, Y1.

Operation in normal scan is explained below. The density converter 24 performs -log conversion of the data R5, G5, B5 received from the HVC converter 20 and of the value data V2 received from the value generator (VGEN2) 108 to density data DR, DG, DB and DV. A lookup table for density conversion exists in the shared RAM 26, and the CPU 34 stores the conversion data to the shared RAM 26 beforehand according to background density based on automatic exposure obtained before normal scan for reading the document. First, the value generator 108 generates value V2 by a calculation of V2=R5*RV+G5*GV+B5*BV, wherein RV, GV and BV are coefficients for value calculation. When image data R5, G5, B5 and value data V2 are inputted to the address of the shared RAM 26, the corresponding density data DR, DG, DB, DV are outputted to be returned to the density converter 24. Then, the density data DR, DG and DB are sent to the masking calculator 28.

Next, operation in prescan is explained. The document is scanned at a speed four times that on normal scan to acquire data for the automatic exposure, automatic color selection and document size detection. Both for automatic exposure and for automatic color selection, data sampling is performed every sixteen dots in the normal scan direction and every four dots in the subscan direction. The CPU 34 clears the data in the RAM 26 beforehand.

In the automatic exposure (AE), distribution of value data of the document is prepared, and a correction quantity for whitening the bright portion or background in the document is determined.

Figure 5:
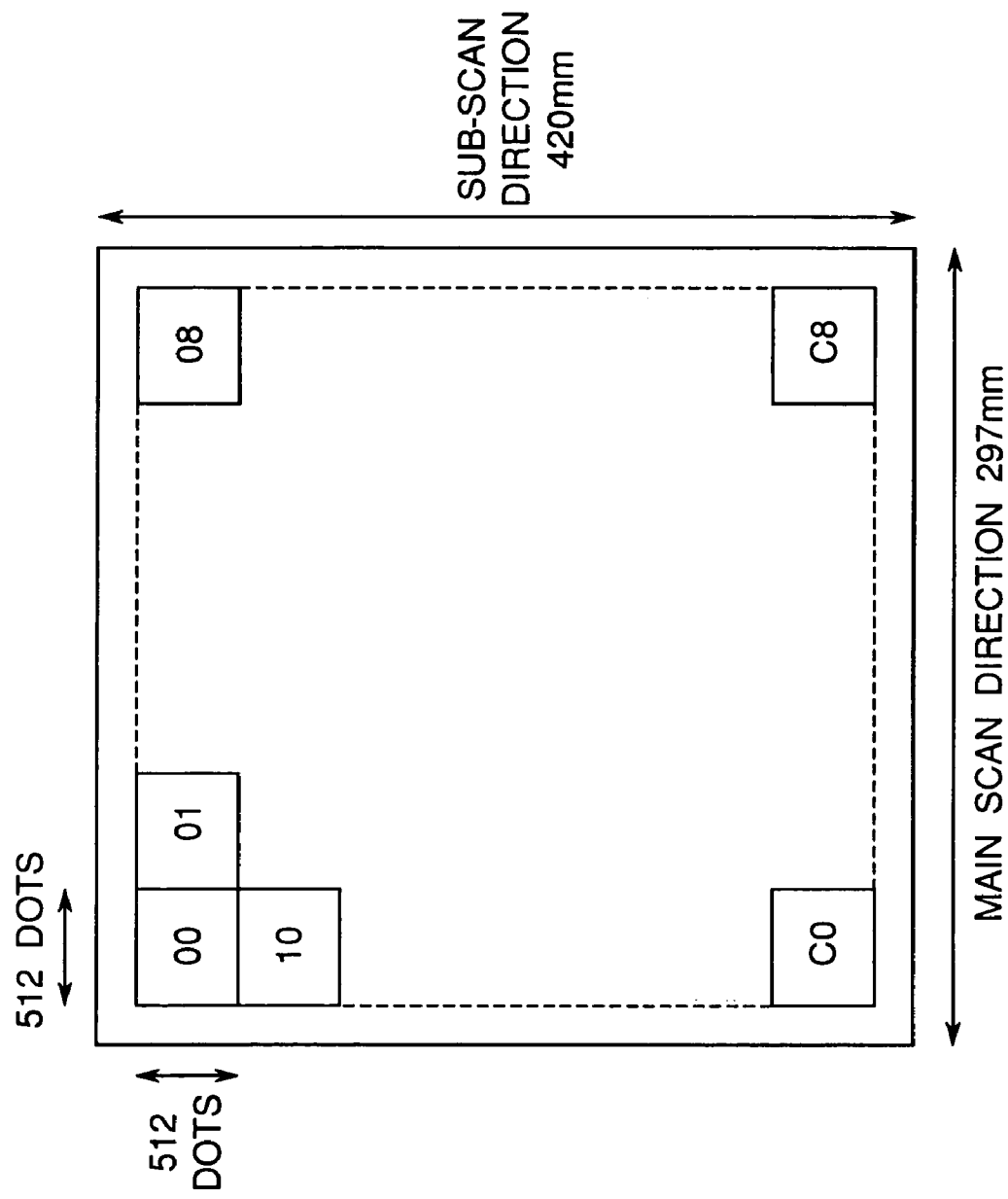
FIG. 5 is a diagram on a relationship between a document of A3 size and reference patch for automatic color selection.

In the automatic color selection (ACS), a number of color pixels existing in each area of 512*512 pixels in the document is determined, and based on a number of areas wherein the number of color pixels exceeds a predetermined number, it is determined whether the document is a color document or a monochromatic one. FIG. 5 shows correlation between a document of A3 size and the areas of 512*512 pixels for automatic color selection. The number in each area corresponds to address ACSAD of the RAM 26 on the automatic color selection. The RAM 26 stores the sums of color pixels for the areas. The resolution is 400 dots per inch.

In the document size detection, it is determined at intervals of 32 dots in the normal scan direction and of 512 lines in the subscan direction whether the object pixel has a high value or not. The document size is determined according to the distribution of pixels of high value data. When a document cover is made of a mirror-like material of high reflectivity, the lamp light is reflected normally, and it does not enter the CCD sensor 10 or the image is black. On the other hand, a portion in a document reflects light randomly, and a color according to document information enters the CDD sensor 10. The high value pixel is determined by using the difference, and the document size is detected according to the determination.

Automatic exposure control is explained below. In FIG. 3, a counter (VCNT) 110 is a counter for obtaining subscan position, and its output VA [15:0] is connected to an address generator (ADGEN) 112. Signal VA[15:0] shows a trigger signal generated each time the counter 115 counts up from 0 to 15. That is, [15:0] means that the signal is generated each time the count from 0 to 15 is completed. A counter (HCNT) 114 is a counter for obtaining normal scan position, and its output HA [15:0] is connected to the address generator (ADGEN) 112 and to a comparator (COMP1) 116. The comparator 116 sets EQ2=0 when output HA [3:0] of the counter 114 is 14 and sets EQ1=0 when the outputs HA [3:0] is 15. This is used as a sampling signal for data sampling every 16 pixels in the normal scan direction.

When a value generator (VGEN1) receives the image data R4, G4, B4 from the magnification change and move section 16, it calculates value V1 similarly to the density conversion (V1=R4*RV+G4*GV+B4*BV). The value V1 is latched by a latch (LATCH1) 120 at the timing of EQ2, and an address SESD is sent via selectors 104 and 106 to address terminals of the two RAMs 264, 266. When the address is determined, the output data is incremented by one by an adder (ADD2) 122 and is written to the RAMs 264, 266 at the timing of EQ1=0. The data in the RAMs 264, 266 are 8-bit data, but by combining the two buses, the data can be counted up to 256*256.

Next, automatic color selection control is explained. In FIG. 3, a value generator (WGEN) 124 calculates chroma W. That is, W=MAX(R4, G4, B4)−MIN(R4, G4, B4). A comparator (COMP2) 126 compares W with reference value WREF and outputs 1 when W is larger than WREF. The output is latched by a latch (LATCH2) 128 as color pixel signal CCNT. An address generator (ADGEN) 112 generates RAM address ACSAD for automatic color selection according to the outputs VA and HA of the two counters (VCNT, HCNT) 110, 114 (ACSAD[7:0]=VA [10:7], HA[12:9]). Because the prescan speed is four times, address ACDAD is changed every area of 512*512 dots. When the addresses of the RAMs 260, 262 are determined, an adder (ADD1) 124 increments the output data by one only when the sampling element is color (CCNT=1) and writes the sum to the RAM 260 at the timing of EQ1=0.

Next, a document size detection controller 138 (a block denotes as DOC in FIG. 3) is explained. As shown in FIG. 4, in the document size detection controller 138, a maximum circuit (MAX) 130 determines a maximum in the image data of R, G, B. The maximum represents the degree of blackness, and the degree of blackness increases with increase in the value of the maximum. A comparator (COMPD) 132 compares the maximum with a reference value VREFD and outputs 1 when the maximum is larger than VREF. The output of the comparator is connected to a 32-bit shift register 134, and it is sampled every 16 bits according to EQ2 from the comparator 116. Adjacent two outputs of the shift register 134 are AND-connected by an AND gate 136, and the AND gate outputs 1 when the two sampling pixels are both 1. The outputs of eight AND gates D0 to D7 are assigned to corresponding bits and are stored in the RAM 262. The address of the RAM 262 is changed every area of 512*512 dots, similarly to the automatic color selection. Thus, a document is monitored at samplings every 512 lines in the subscan direction and every 32 dots in the normal scan line. According to the resul5 of the processing, a portion wherein data "1" are distributed largely is recognized as exterior to the document.

After prescan is completed, the CPU 34 reads the data stored in the RAM 26 and sets the amount for background correction (automatic exposure), decides whether the document is a color or monochromatic document (automatic color selection) and sets the document size (document size detection).

In the color image processing apparatus shown in FIG. 2, a block for the processing between the HVC converter 20 and the MTF corrector 32 (a portion enclosed with a dashed line) is represented as components arranged, in a circuit. However, they may be constructed by using a rewritable device with which the content of the circuit can be rewritten repeatedly in a state where the components are mounted. The device is, for example, a field gate programmable array (FPGA). A read only memory (ROM) 36 stores algorithm information for the processing circuit for the FPGA. That is, the image preprocessor and a part in the main image processor are composed by the rewritable device (FPGA). In prescan, the FPGA is constructed have a function of the processing circuit of the image preprocessor, and in normal scan, it is constructed to have a function of the part of the processing circuit in the main image processor. That is, in prescan, the CPU 34 programs the circuits of the AE/ACS/ document size detection controller 18 and the shared RAM 26 in the FPGA, and the FPGA performs the processings of automatic exposure, automatic color selection and document size detection. In normal scan, the CPU 34 programs the circuits of the density converter 24, the shared RAM 26, the masking calculator 28 and the undercolor remove and black paint section 30 to the FPGA, and the FPGA performs the processings for image forming after the prescan. (The written circuits are the circuit parts shown in FIGS. 3 and 4. The selectors 100 shown in FIG. 3 are not needed eventually.) Because the CPU 34 programs the circuits in correspondence to operation mode with reference to ROM 36, a plurality of function can be provided with a relatively small gate scale.

The shared memory 26 is used by the density converter 24 in normal scan in this example, but a circuit to be used o share the memory 26 is not limited to the block. A memory for line delay, a lookup table or the like is used in a plurality of portions, and the shared memory 26 may be used therefor.

Further, the block from the density converter 24 to the undercolor remove and black paint section 30 is written to the FPGA on normal scan in this example, but a circuit to be used with the FPGA is not limited to the block. The HVC converter 20, the magnification change and move section 16 or the like provided in the upstream direction may also be used therefor.

Figure 6:
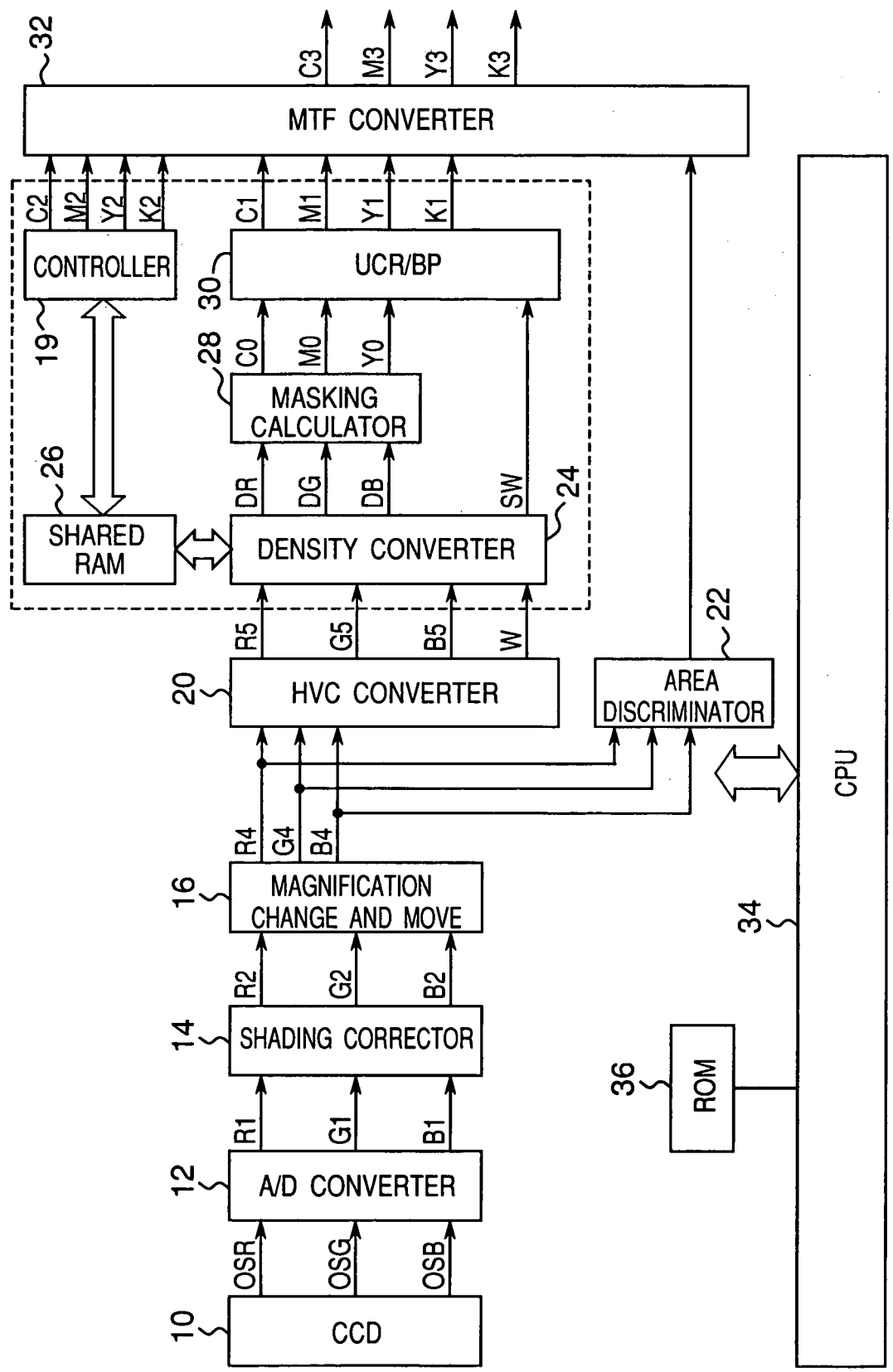
FIG. 6 is a block diagram of an image processing apparatus of a second embodiment of the invention.

FIG. 6 shows an entire structure of a color image processing apparatus according to a second embodiment of the invention. The color image processing apparatus has test print mode besides normal print mode. Output signals of red, green and blue of a color CCD (charge coupled device) sensor 10 consisting of line sensors of three colors are converted to digital image data by an analog-to-digital converter 12. The digital image data of red (R), green (G) and blue (B) are corrected by a shading corrector 14 and are sent to a magnification change and move section 16. Data R4, G4, B4 which have been subjected in the section 16 to the magnification change processing and move processing are sent to an HVC converter 20 and an area discriminator 22. The HVC converter 20 converts the data R4, G4, B4 to HVC data and sends chroma data W to an undercolor remove and black paint section 30, while it sends the input data to a density converter 24 as data R5, G5, B5. A random access memory (RAM) 26 is shared by the density converter 24 and a test print controller 19. A lookup table for density conversion is stored in the RAM 26. The density converter 24 converts the image data R5, G5, B5 received from the HVC converter 20 to density data DR, DG, DB by using -log conversion based on the data stored in the RAM 26, and a masking calculator 28 converts the density data DR, DG, DB to print data of cyan (C0), magenta (M0), yellow (Y0) and black (K0). Further, the undercolor remove and black paint section 30 performs the undercolor remove and black paint processing on the print color data C0, M0, Y0 by using the chroma data W and outputs data C1, M1, Y1, K1. Further, an area discriminator 22 discriminates various types of areas based on the input data. An MTF corrector 32 corrects the data C1, M1, Y1, K1 according to the discrimination result of the area discriminator 22 and sends the corrected data to a printer. The CPU 34 controls the above-mentioned color image processing apparatus.

In test print mode, a patch pattern of 512*512 dots is printed at a predetermined density. The CPU 34 stores gradation data at relevant addresses for the area in the shared RAM 26 beforehand. The test print controller 19 sends test print data in the RAM 26 to an MTF corrector 32, which outputs data C3, M3, Y3, K3 to a print controller.

Figure 7:
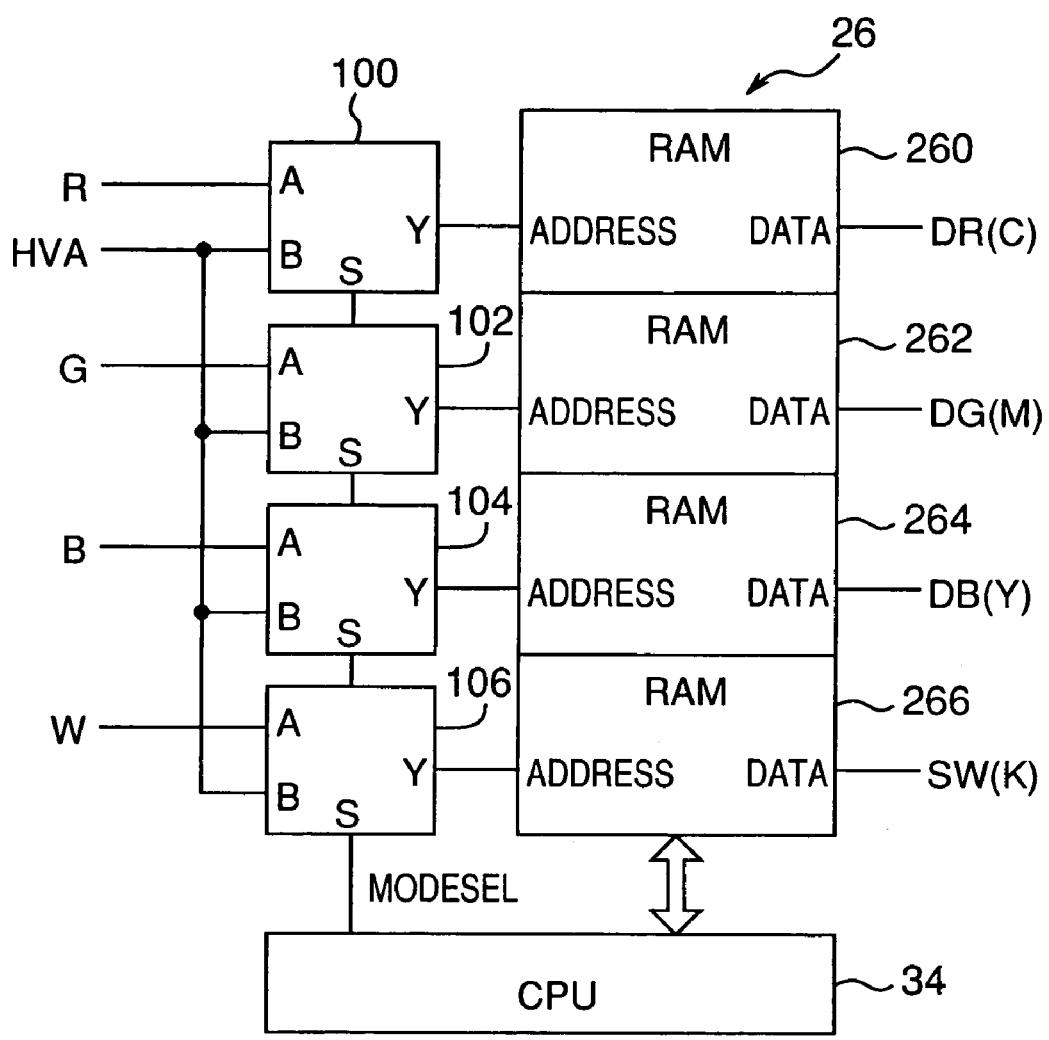
FIG. 7 is a block diagram of a shared RAM.

FIG. 7 shows the structure of the shared RAM 26. The shared RAM 26 consists of four memories 260, 262, 264 and 266 for R, G, B and V, and it is shared by the test print controller 19 and the density converter 24. The address ADDRESS of the RAMs 260, 262, 264, 266 connected to selectors 100, 102, 104, 106 are changed between the test print controller 19 and the density converter 24 according to select signal (MODESEL) inputted to selectors 100, 102, 104, 106. In test print mode, the CPU 34 sets the mode selection signal MODESEL to 0 to connect the RAM 26 to the test print controller 19. In normal scan mode, the CPU 34 sets mode selection signal MODESEL to 1 to connect the RAM 26 to the density converter 24.

In normal mode, the density converter 24 performs -log conversion on the data R, G, B received from the HVC converter 20 to density data DR, DG, DB. A lookup table for density conversion exists in the RAM 26, and the CPU 34 stores the conversion data to the RAM 26 beforehand. Further, the CPU 34 sets MODESEL to 0 to set the selectors 100, 102, 104, 106 and outputs image data R5, G5, B5 and chroma data W to the density converter 24 to address terminals of the shared RAM 26. Then, the RAM 26 outputs corresponding density data DR, DG, DB, SW which are returned to the density converter 24. The density data DR, DG, DB, SW from the density converter 24 are processed further in the masking calculator 28 and the undercolor remove and black paint section 30 and are sent to an MTF corrector 32. The MTF corrector 32 performs MTF correction according to the recognition result of the area discriminator 22 and sends the data to a print engine.

Figure 8:
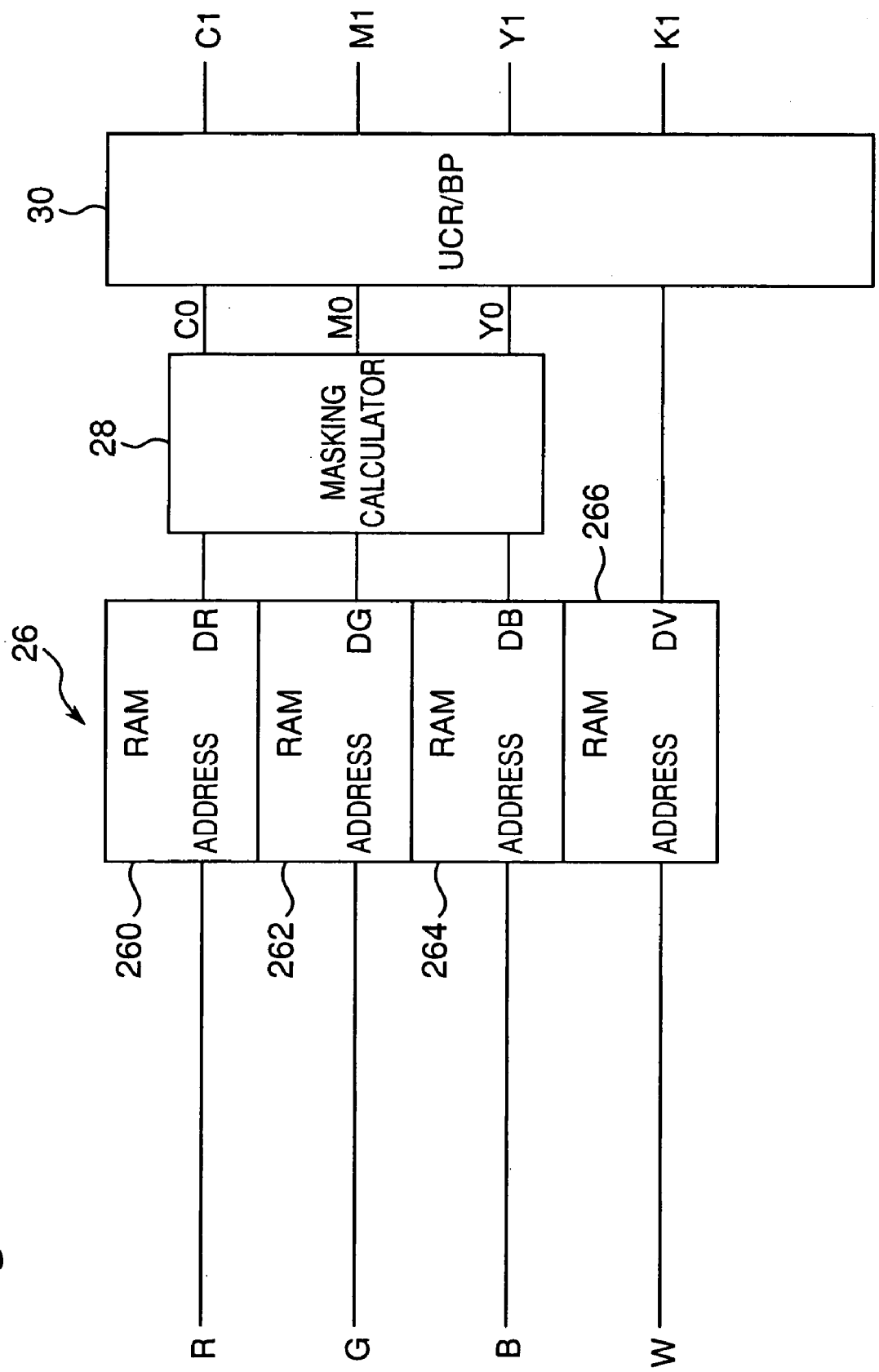
FIG. 8 is a block diagram of a block written to a field programmable gate array in print mode.

FIG. 8 shows a block (including the density converter, the masking calculator and the undercolor remove and black paint section) used in normal print mode. The shared RAM 26 consists of the four memories 260, 262, 264 and 266. Data R, G, B, W are sent to address terminals of the RAMs 260, 262, 264 and 266, and data DR, DG, DB, SW after the density conversion are outputted. The RAM 26 is operated as the density converter 24. The masking calculator 28 converts the data DR, DG, DB, SW to data C, M, Y. Finally, the undercolor remove and black paint section 30 performs undercolor remove processing and black paint processing, wherein as to the data C, M, Y, the masking calculation results are subtracted by a product of the chroma data SW and a minimum of the density data.

$$C1=C0-SW*\mathrm{MIN}(DR, DG, DB),$$

$$M1=M0-SW*\mathrm{MIN}(DR, DG, DB),$$

and $$Y1=Y0-SW*\mathrm{MIN}(DR, DG, DB).$$

The data K1 is obtained by subtracted a predetermined value from a product of the chroma data SW and a minimum of the density data.

$$K1=SW*\mathrm{MIN}(DR, DG, DB)-SD.$$

In test print mode, patch patterns each of 512*512 dots is printed at a predetermined density. FIG. 5 shows patches and patch addresses in test print in an example of a sheet of paper of A3 size at 400 dots per inch. In the A3 paper, 117 patches are printed. Numerals in squares show the patch addresses. Each patch is printed with gradation data stored in the shared RAM 26. The RAM 26 stores the gradation data at relevant patch addresses. In this embodiment, 117 patch patterns are printed, but the shapes and colors of the patch patterns may be changed as desired.

FIG. 9 shows block used in test print mode. In the test print controller 19, dot counters 240, 242 in the normal scan direction and in the subscan direction are operated according to effective area signals for normal scan and for subscan (not shown). An address controller 244 receives HA(VA) [15:0] as position information and outputs HVA[7:0]=HA[12:9], VA[12:9] to the address terminals of the RAMs 260, 262, 264, 266. The RAMs 260, 262, 264, 266 return gradation data C2, M2, Y2, K2 to the test print controller 19 according to the input patch addresses and sends them to the MTF corrector 32. The CPU 34 sets to pass the output data through the MTF corrector 32, which sends the as-received data C2, M2, Y2, K2 as data C3, M3, Y3, K3 to the print engine.

In the color image processing apparatus shown in FIG. 6, a block for processing between the HVC converter 20 and the MTF corrector 32 (a portion enclosed with a dashed line) may be constructed with a rewritable device with which the content of the circuit can be rewritten repeatedly in a state where components are mounted. The device is, for example, a field gate programmable array (FPGA). A read only memory (ROM) 36 stores algorithm information for a processing circuit for the FPGA. That is, the image preprocessor and the part in the main image processor are composed by the rewritable device (FPGA). Because the CPU 34 programs circuit functions in correspondence to operation mode with reference to ROM 36, a plurality of function can be provided in a relatively small gate scale. In FIG. 6, the CPU 34 programs the circuits of the RAM 26 and the test print controller 19 in the FPGA in test print mode to rewrite the contents in the circuit, and performs test print processing. After this processing, in normal scan, the CPU 34 programs the circuits of the density converter24, the RAM 26, the masking calculator 28 and the undercolor remove and black paint section 30 to the FPGA, to rewrite the circuits for image forming after the prescan. The circuits written to the FPGA are constructed to have about the same volume in any mode.

In the above-mentioned second embodiment, the shared memory 26 is used by the density converter 24 in normal print mode, but the memory 26 may be shared by a different block.

Further, the block from the density converter 24 to the undercolor remove and black paint section 30 is written to the FPGA on normal scan in this example, but a circuit to be used with the FPGA is not limited to the block. The HVC converter 20, the magnification change and move section 16 or the like in the upstream direction may also be therefor.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus which performs a first operation and a second operation different from the first operation, the image processing apparatus comprising:
a first processor which processes image data in correspondence to the first operation;
a second processor which processes image data in correspondence to the second operation;
a memory shared by said first and second processors; and
a controller which changes connection of said memory to said first and second processors to connect said first processor to said memory in the first operation and to connect said second processor to said memory in the second operation.

2. The image processing apparatus according to claim 1, wherein the first operation is not performed at the same time as the second operation.

3. The image processing apparatus according to claim 1, further comprising an image reader which reads an image by scanning a document; wherein the first operation is prescan for acquiring document information before reading the document image, and the second operation is normal scan for reading the document image; wherein said first processor processes the data on the document image acquired on prescan, and said second processor processes the image data read in normal scan.

4. The image processing apparatus according to claim 3, wherein said first processor comprises a processor for one of automatic exposure, automatic color selection and document size detection and writes data obtained by sampling the document in the prescan to said memory.

5. The image processing apparatus according to claim 3, wherein said second processor comprises a density converter, and said memory stores a conversion table for density conversion performed by said density converter.

6. The image processing apparatus according to claim 3, wherein said first and second processors are constructed by a common device wherein a function thereof can be rewritten, and said controller rewrites the function of said device to operate as said first processor on prescan and to operate as said second processor on normal scan.

7. The image processing apparatus according to claim 6, wherein said device comprises a field gate programmable array.

8. The image processing apparatus according to claim 1, further comprising a printer which prints an image on a sheet of paper;
wherein the first operation is test print for printing predetermined pattern data, and the second operation is normal print for printing document image data; said first processor outputs the pattern data for the test print, and said second processor processes the document image data to print the document image.

9. The image processing apparatus according to claim 8, wherein said second processor comprises a density converter, and said memory stores a conversion table for density conversion performed by said density converter.

10. The image processing apparatus according to claim 8, wherein said first and second processors are constructed by a common device wherein a function thereof can be rewritten, and said controller rewrites the function of said device to operate as said first processor on test print and to operate as said second processor on normal print.

11. The image processing apparatus according to claim 10, wherein said device comprises a field gate programmable array.

12. An image reading apparatus which performs prescan for acquiring document information before reading a document image and performs normal scan for reading the document image, the image reading apparatus comprising:
a first processor which processes the data acquired in prescan;
a second processor which processes image data acquired in normal scan;
a memory shared by said first and second processors; and
a controller which changes connection of said memory to said first and second processors to connect said first processor to said memory on prescan and to connect said second processor to said memory on normal scan;
wherein said memory stores document information acquired in prescan and stores conversion data for conversion of the image data on normal scan.

13. The image reading apparatus according to claim 12, wherein said first and second processors are constructed by a common device wherein a function thereof can be rewritten, and said controller rewrites the function of said device to operate as said first processor on prescan and to operate as said second processor on normal scan.

14. An image forming apparatus which performs test print for printing predetermined pattern data and performs normal print for printing document image data, the image forming apparatus comprising:
- a first processor which generates the predetermined pattern data for test print;
- a second processor which processes image data for normal print;
- a memory shared by said first and second processors; and
- a controller which changes connection of said memory to said first and second processors to connect said first processor to said memory on test print and to connect said second processor to said memory on normal print;

wherein said memory stores the pattern data on test print and stores conversion data for conversion of the image data on normal print.

15. The image forming apparatus according to claim 14, wherein said first and second processors are constructed by a common device wherein a function thereof can be rewritten, and said controller rewrites the function of said device to operate as said first processor on test print and to operate as said second processor on normal print.

* * * * *